United States Patent
Clancy et al.

(10) Patent No.: US 11,251,955 B2
(45) Date of Patent: Feb. 15, 2022

(54) SYSTEM AND METHOD FOR SIMPLIFIED WIFI SET UP OF CLIENT DEVICES

(71) Applicant: ARRIS Enterprises LLC, Suwanee, GA (US)

(72) Inventors: Paul A. Clancy, Duluth, GA (US); James R. Flesch, Suwanee, GA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 15/698,246

(22) Filed: Sep. 7, 2017

(65) Prior Publication Data

US 2019/0074970 A1    Mar. 7, 2019

(51) Int. Cl.
| | |
|---|---|
| H04L 29/06 | (2006.01) |
| H04L 9/32 | (2006.01) |
| H04W 12/06 | (2021.01) |
| G06F 21/44 | (2013.01) |
| G09C 5/00 | (2006.01) |
| H04W 12/04 | (2021.01) |

(52) U.S. Cl.
CPC ............ *H04L 9/3213* (2013.01); *G06F 21/44* (2013.01); *G09C 5/00* (2013.01); *H04L 63/0853* (2013.01); *H04W 12/06* (2013.01); *H04L 2209/80* (2013.01); *H04W 12/04* (2013.01)

(58) Field of Classification Search
CPC . H04L 9/3231; H04L 63/083; H04L 63/0853; H04L 2209/80; H04W 4/003; H04W 12/06; H04W 12/04; G06F 21/44; G09C 5/00
USPC ........................................................ 726/5, 7
See application file for complete search history.

(56) References Cited

U.S. PATENT DOCUMENTS

| | | | | |
|---|---|---|---|---|
| 5,987,306 A | * | 11/1999 | Nilsen ................. | H04M 3/2254 455/67.11 |
| 7,308,261 B2 | * | 12/2007 | Henderson .............. | H04L 51/04 455/435.1 |

(Continued)

FOREIGN PATENT DOCUMENTS

| | | | | |
|---|---|---|---|---|
| EP | 2854358 A1 | * | 4/2015 | .............. H04W 4/70 |
| KR | 20150130517 A | * | 3/2013 | |

OTHER PUBLICATIONS

Joachim Biskup, et al., Towards a credential-based implementation of compound access control policies, SACMAT '04: Proceedings of the ninth ACM symposium on Access control models and technologiesJun. 2004 pp. 31-40.*

*Primary Examiner* — Jeffery L Williams
(74) *Attorney, Agent, or Firm* — Wenderoth, Lind & Ponack, L.L.P.

(57) ABSTRACT

A wireless communication device for use with a communication device and a network gateway connected to the Internet, wherein the communication device can communicate with the network gateway. The wireless communication device includes: a communication component operable to communicate with the network gateway; a memory component having temporary network access credentials stored therein; and a credential feature associated with the temporary network access credentials and being accessible by the communication device. The communication component can further establish a temporary network connection with the gateway based on the temporary network access credentials, and can further join a permanent network with the gateway.

14 Claims, 7 Drawing Sheets

(56) References Cited

U.S. PATENT DOCUMENTS

| | | | | |
|---|---|---|---|---|
| 7,801,517 | B2* | 9/2010 | Silvestri | H04W 48/18 455/423 |
| 9,055,385 | B1* | 6/2015 | Singh | H04W 4/21 |
| 9,900,919 | B1* | 2/2018 | Butler | H04W 52/0216 |
| 10,154,025 | B2* | 12/2018 | Tinnakornsrisuphap | H04L 63/083 |
| 10,194,511 | B1* | 1/2019 | Hieb | H05B 47/19 |
| 10,419,908 | B1* | 9/2019 | Hutz | H04W 60/00 |
| 2005/0164634 | A1* | 7/2005 | Tanaka | H04L 9/3213 455/41.2 |
| 2008/0064367 | A1* | 3/2008 | Nath | H04L 63/0492 455/411 |
| 2008/0260149 | A1* | 10/2008 | Gehrmann | G06Q 20/3821 380/247 |
| 2009/0025070 | A1* | 1/2009 | Netanel | H04W 12/08 726/5 |
| 2009/0217038 | A1* | 8/2009 | Lehtovirta | H04L 29/12783 713/168 |
| 2009/0217364 | A1* | 8/2009 | Salmela | H04W 12/0608 726/6 |
| 2011/0265158 | A1* | 10/2011 | Cha | H04L 67/125 726/6 |
| 2013/0081121 | A1* | 3/2013 | Green | H04L 9/0827 726/7 |
| 2014/0282960 | A1* | 9/2014 | Tinnakornsrisuphap | H04L 63/08 726/7 |
| 2016/0009525 | A1* | 1/2016 | DePaola | G07C 9/00896 187/380 |
| 2017/0295491 | A1* | 10/2017 | Gehrmann | H04W 4/70 |
| 2017/0339631 | A1* | 11/2017 | Pugaczewski | H04L 63/101 |
| 2017/0347264 | A1* | 11/2017 | Holland | H04L 63/0823 |
| 2018/0005143 | A1* | 1/2018 | Camargo | H04W 12/0804 |
| 2018/0220476 | A1* | 8/2018 | Jung | H04W 12/06 |
| 2018/0367539 | A1* | 12/2018 | Huang | H04W 12/06 |
| 2019/0104422 | A1* | 4/2019 | Chiang | H04W 48/08 |
| 2020/0162909 | A1* | 5/2020 | Spencer | H04W 60/00 |

* cited by examiner

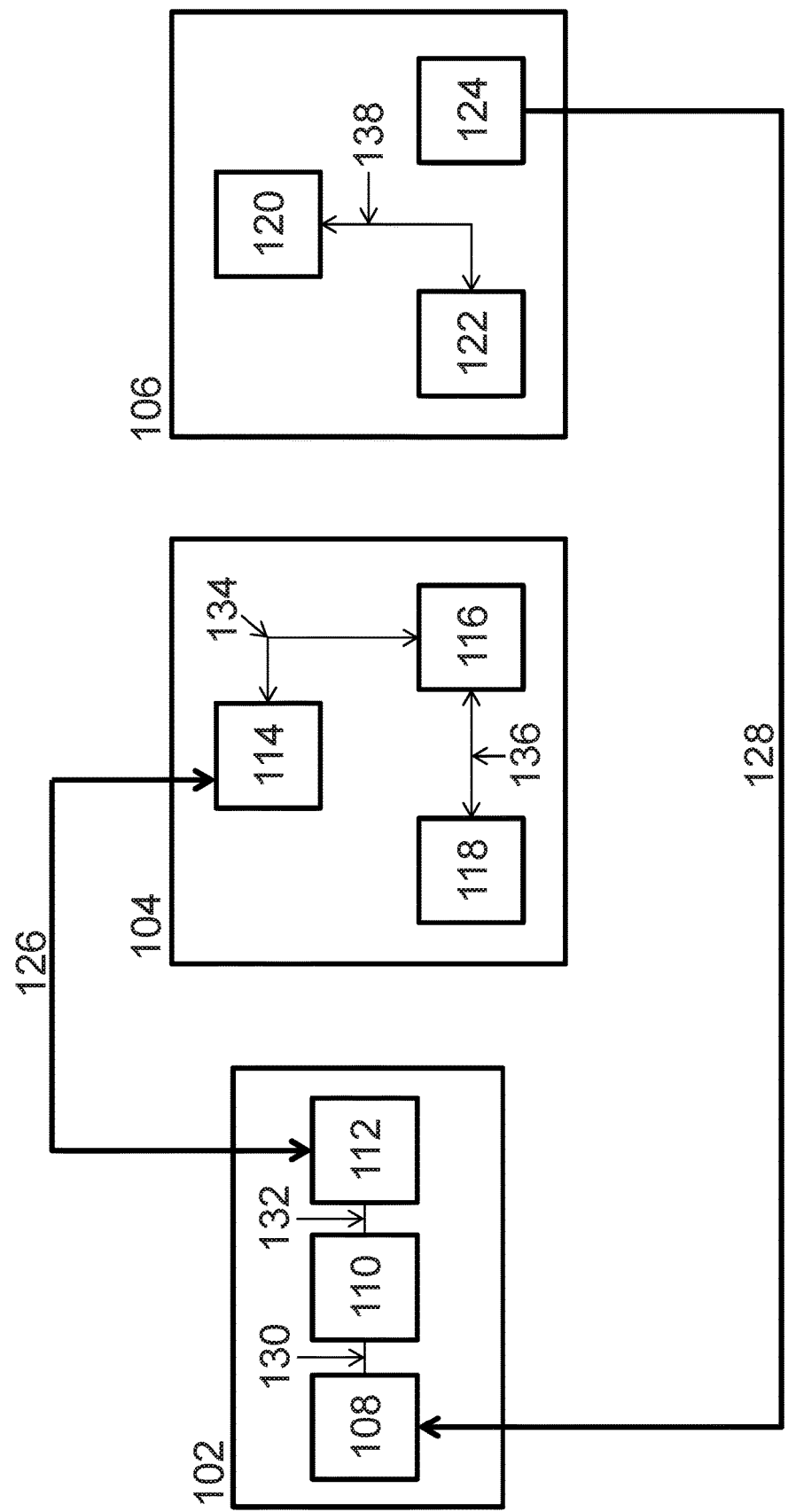

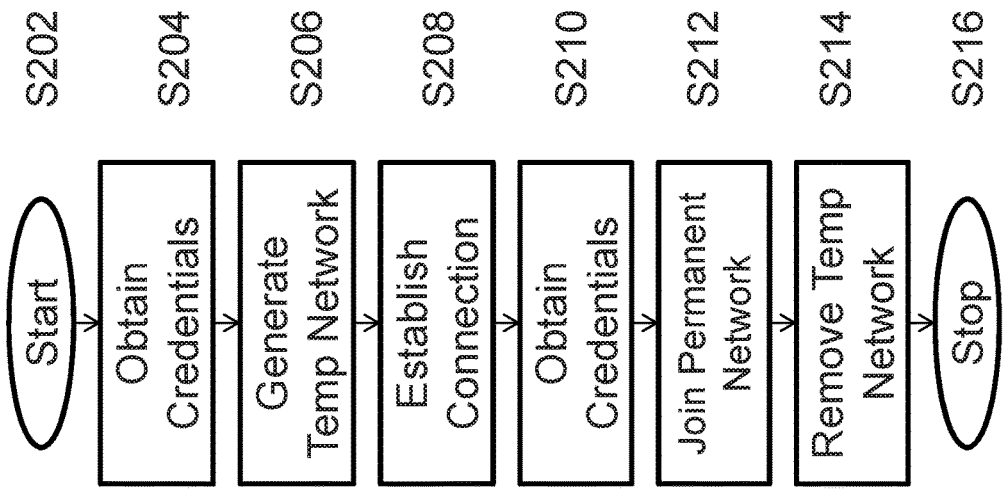

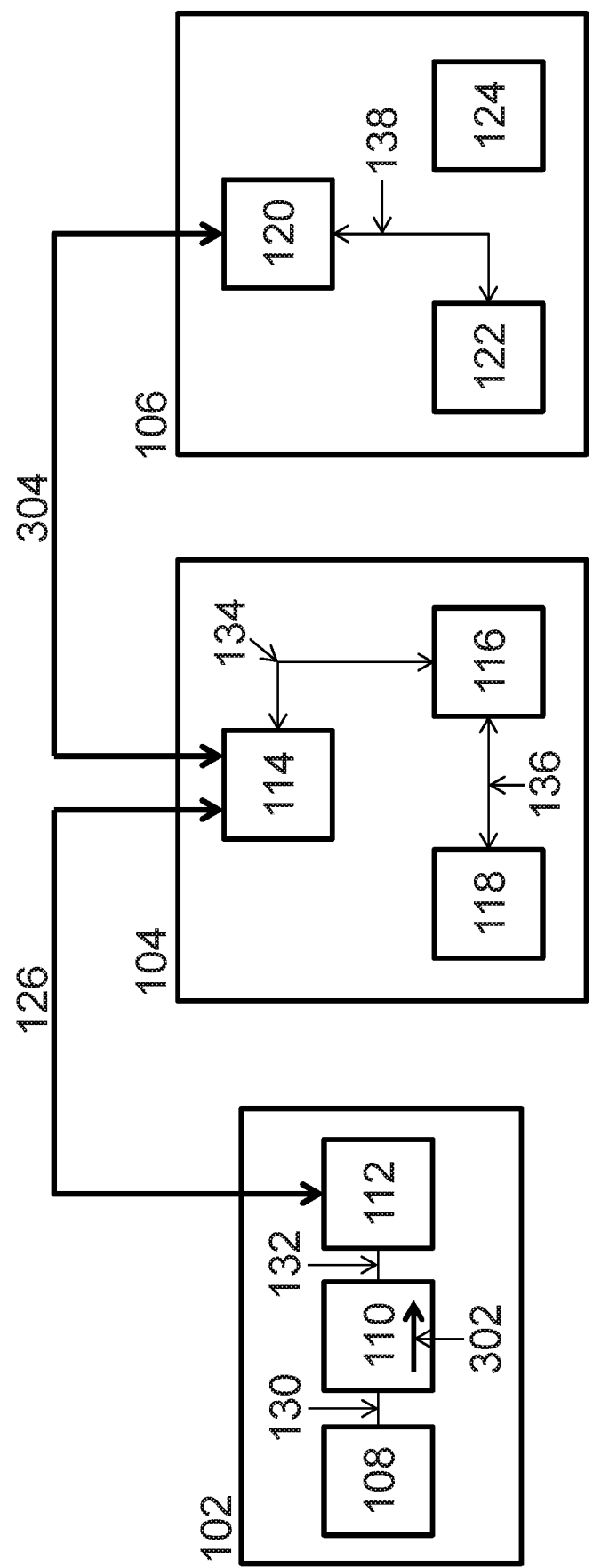

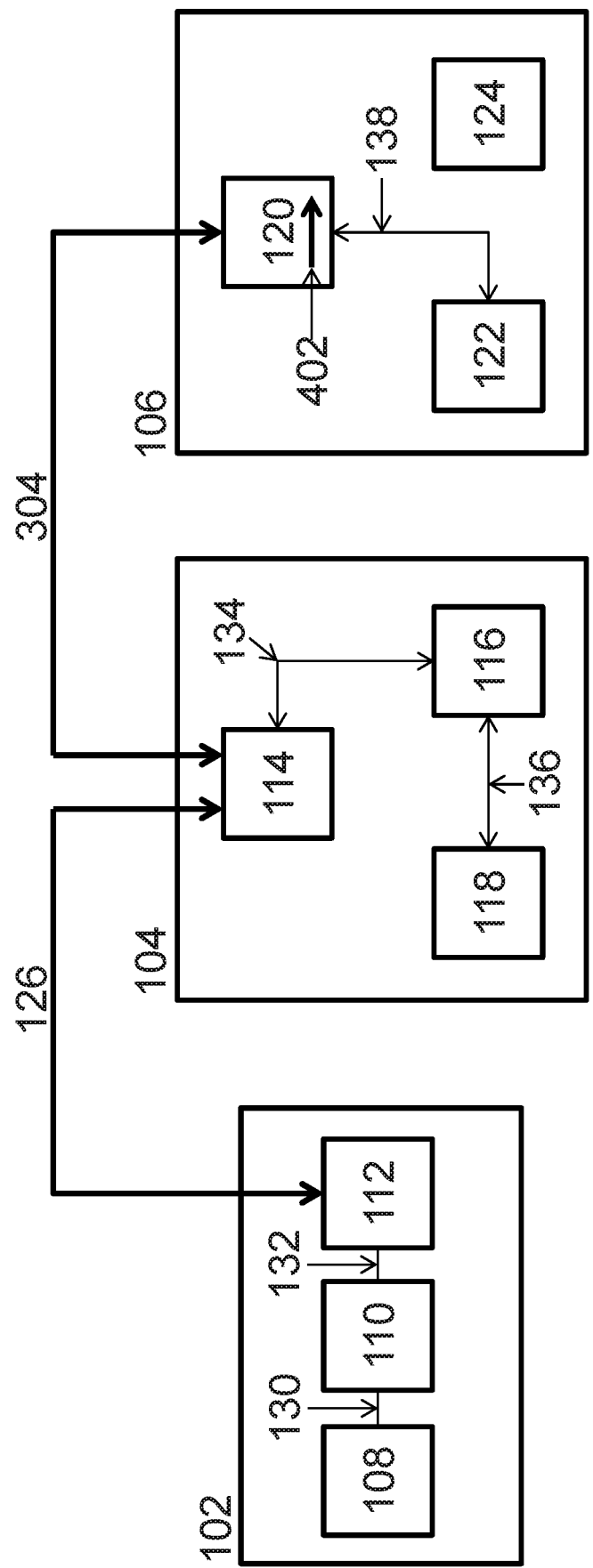

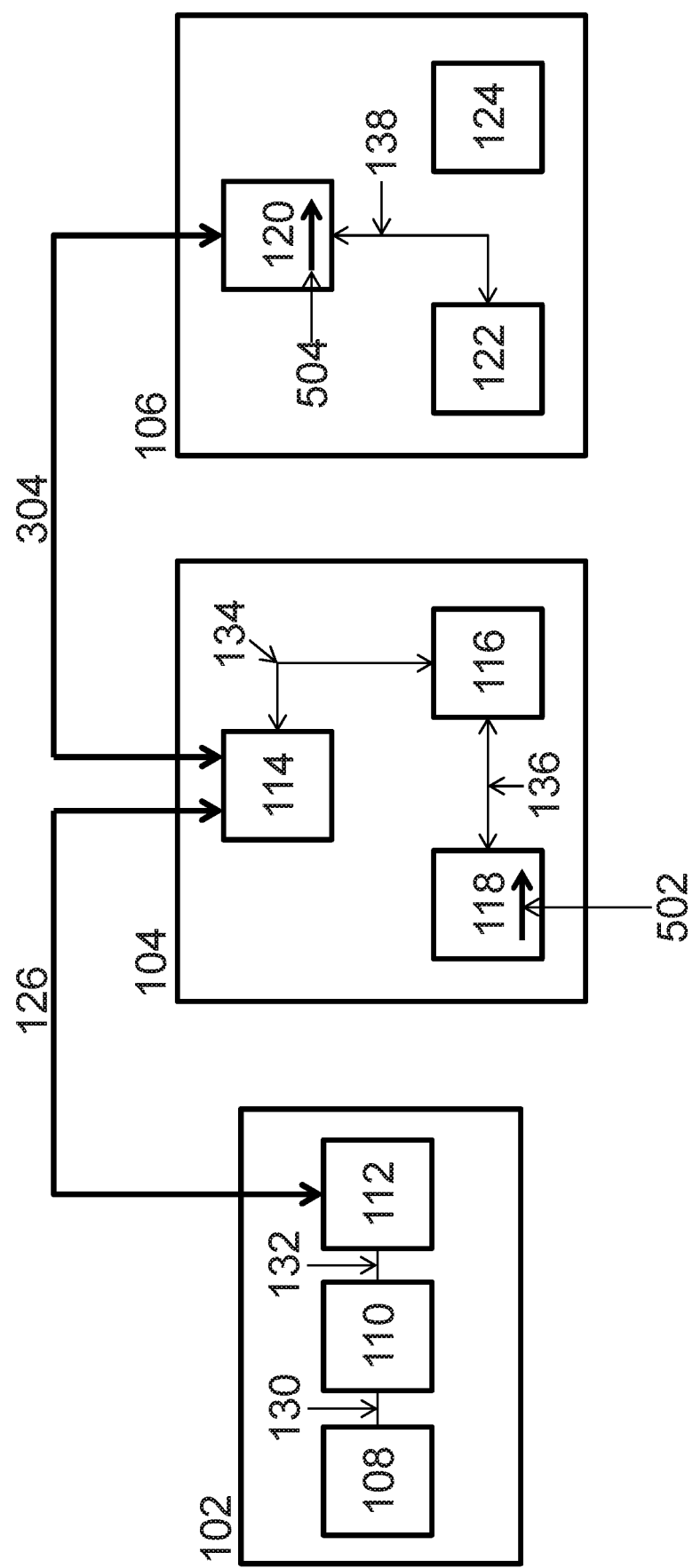

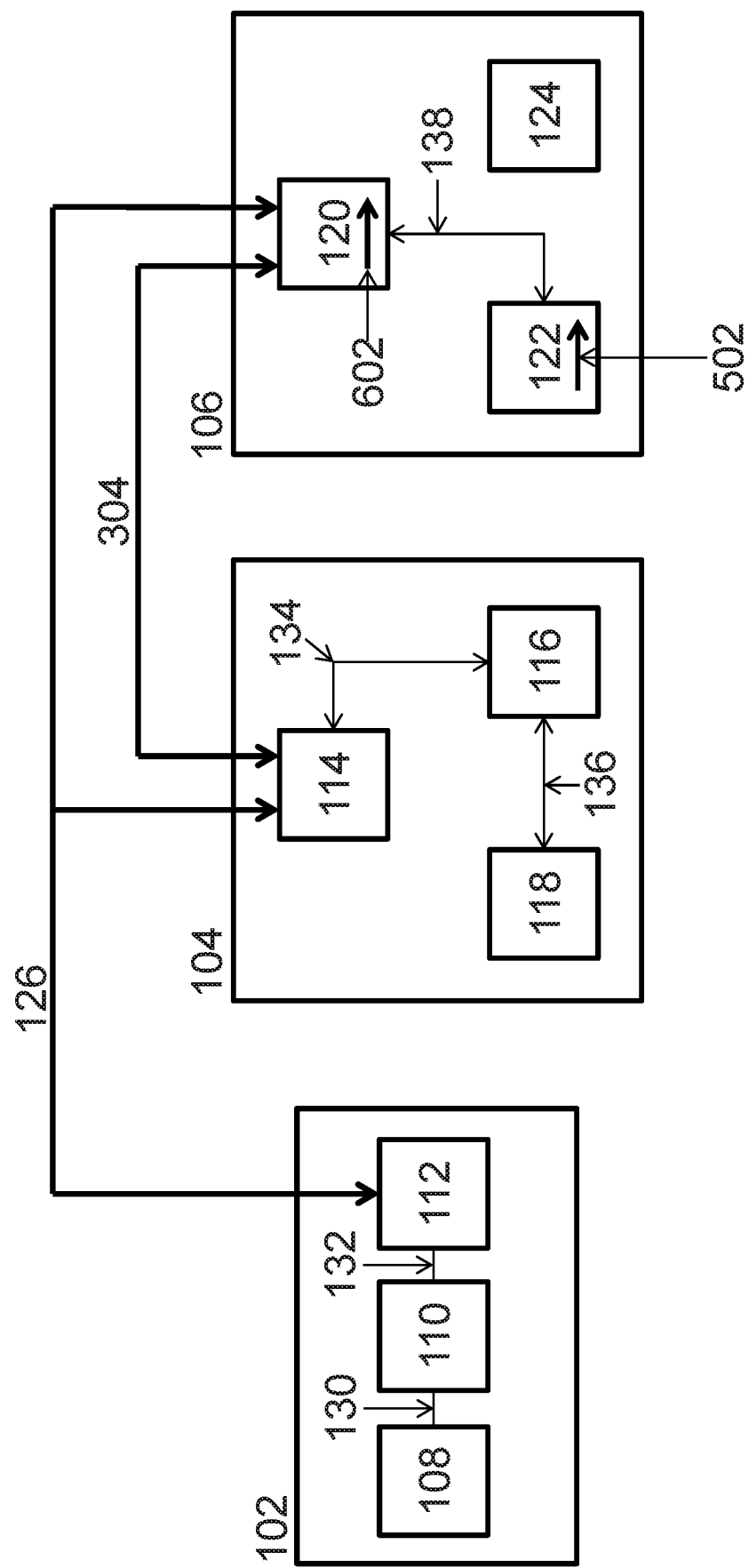

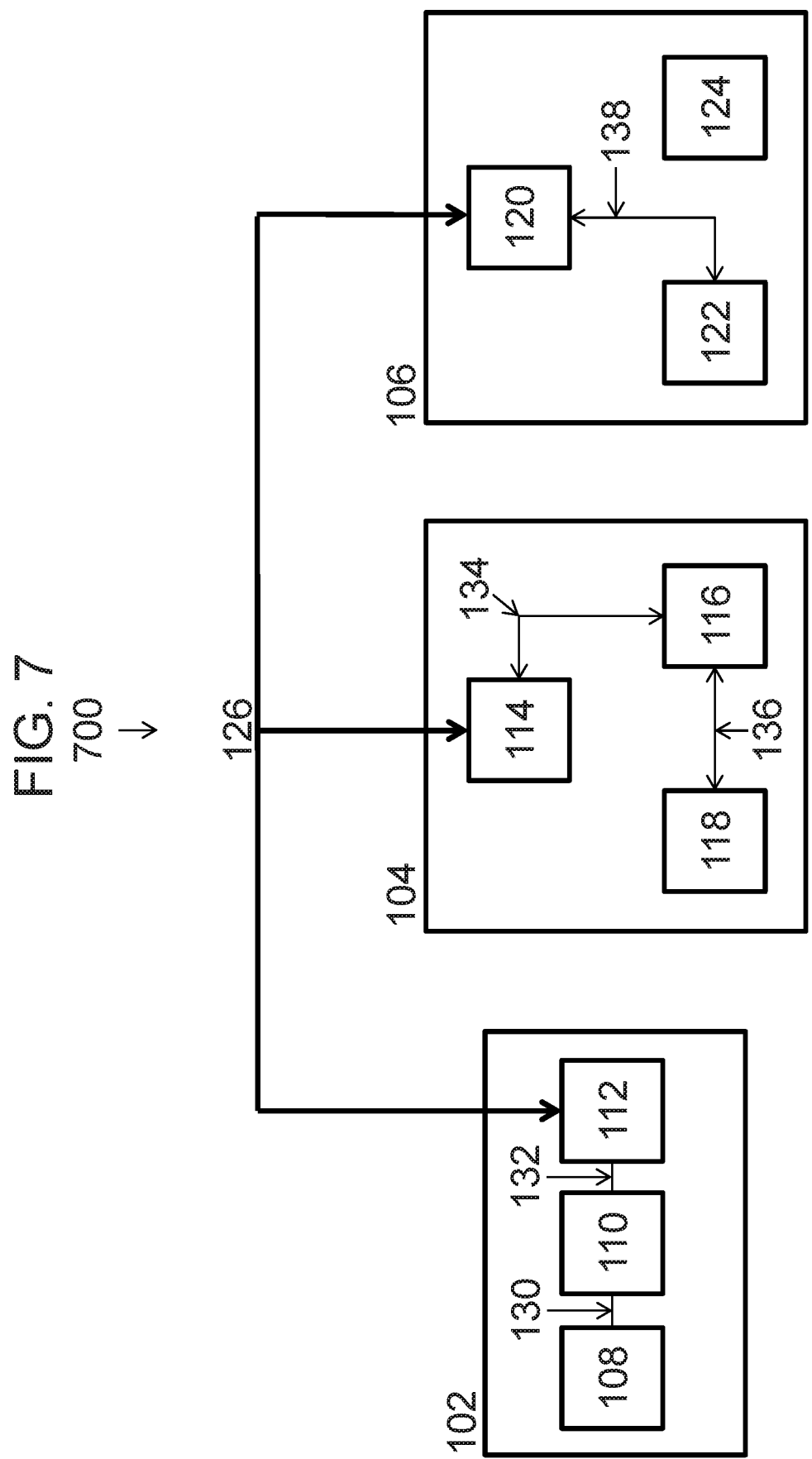

SYSTEM AND METHOD FOR SIMPLIFIED WIFI SET UP OF CLIENT DEVICES

BACKGROUND

Embodiments of the invention relate to devices and methods for providing network setup information to client devices.

There exists a need for a system and method for simplifying network setup and access for client devices.

SUMMARY

Aspects of the present invention are drawn to wireless communication device for use with a communication device and a network gateway connected to the Internet, wherein the communication device can communicate with the network gateway. The wireless communication device includes: a communication component operable to communicate with the network gateway; a memory component having temporary network access credentials stored therein; and a credential feature associated with the temporary network access credentials and being accessible by the communication device. The communication component can further establish a temporary network connection with the gateway based on the temporary network access credentials, and can further join a permanent network with the gateway.

BRIEF SUMMARY OF THE DRAWINGS

The accompanying drawings, which are incorporated in and form a part of the specification, illustrate example embodiments and, together with the description, serve to explain the principles of the invention. In the drawings:

FIG. 1 illustrates a wireless communication device that is to join a permanent network in accordance with aspects of the present invention;

FIG. 2 illustrates a flowchart of the operation of a system operating in accordance with aspects of the present invention;

FIG. 3 illustrates a network gateway generating a temporary network in accordance with aspects of the present invention;

FIG. 4 illustrates a network gateway and wireless communication device establishing a connection in accordance with aspects of the present invention;

FIG. 5 illustrates a network gateway and wireless communication device transmitting access credentials in accordance with aspects of the present invention;

FIG. 6 illustrates a wireless communication device joining a permanent network in accordance with aspects of the present invention; and FIG. 7 illustrates a network gateway removing a temporary network in accordance with aspects of the present invention.

DETAILED DESCRIPTION

Aspects of the present invention are drawn to a system and method for using a communication device to connect a wireless communication device to a network gateway.

In accordance with aspects of the present invention, a communication device such as a smart phone, tablet, personal computer, etc, is used to connect a wireless communication device, such as a smart thermostat to a network gateway. A smart thermostat usually needs to be connected to the internet or a network through a network gateway in order to reach its full potential. Being connected to the internet allows the thermostat to monitor temperature and humidity outside of a home and track the entrance and exit of people from a home in order to tailor heating and cooling cycles appropriately.

In order to connect to a permanent network of the network gateway, permanent network access credentials are input into the thermostat, which may be confusing or problematic for people unfamiliar with the process, ultimately leading to the return or disuse of the thermostat. In order to simplify the connection process, a thermostat is presented for use with a network gateway and a communication device such as a smart phone.

If the user has a smart phone, the user has already connected their phone to their network themselves or with the assistance of the device provider. With this in mind, the thermostat comes with preinstalled temporary network access credentials in the form of a physical feature, non-limiting examples of which include a serial number, a QR code, a bar code, a display and combinations thereof. If, for example, the physical feature is a display, the display may generate temporary network access credentials on demand. For purposes of discussion, in example embodiments discusses hereafter, the physical feature associated with preinstalled temporary network access credentials is a QR code. The temporary network access credentials may be obtained simply by having the user scan the QR code with their smart phone.

Since their phone is already connected to their network gateway, the smart phone is operable to transfer the preinstalled temporary network access credentials to the network gateway. The network gateway may then create a network using the temporary network credentials to which the thermostat will automatically connect. Permanent network access credentials for the permanent network of the network gateway are then transferred to the thermostat using the temporary network.

After transferring the permanent network access credentials, the temporary network is removed, and the thermostat can use the newly obtained access credentials to join the permanent network. In this manner, the thermostat can be installed and setup with only a single step required by the user.

Aspects of the present invention will now be described with reference to FIGS. 1-7.

FIG. 1 illustrates a system 100 of a wireless communication device that is to be connected to a network in accordance with aspects of the present invention.

As shown in the figure, system 100 includes a communication device 102, a network gateway 104, and a wireless communication device 106. Communication device 102 further includes an input component 108, an instruction generating component 110, and a communication component 112. Network gateway 104 further includes a communication component 114, an onboarding component 116, and a memory 118. Wireless communication device 106 further includes a communication component 120, a memory 122, and a credential feature 124.

Input component 108 is operable to input temporary network access credentials 128 associated with credential feature 124 of wireless communication device 106. Input component 108 is additionally operable to provide temporary network access credentials 128 to instruction generating component 110, via line 130.

Instruction generating component 110 is operable to generate an auto-onboarding instruction based on temporary network access credentials 128 that are provided by input component 108. The auto-onboarding instruction generated by instruction generating component 110 includes temporary network settings information to enable network gateway 104 to establish a temporary network with wireless communication device 106. Instruction generating component 110 is further operable to transmit the auto-onboarding instructions to communication component 112, via line 132.

Communication component 112 is operable to transmit an auto-onboarding instruction received from instruction generating component 110 to communication component 114 of network gateway 104, via a permanent network 126. Permanent network 126 is a network that exists prior to a user beginning the setup process for wireless communication device 106. Permanent network 126 is a permanent network that has been setup and is provided by network gateway 104 for use by all other communication devices a user may have.

Communication component 114 is operable to generate a temporary network with a service set identifier (SSID), password, and security type based on the auto-onboarding instruction provided by communication component 112. An SSID is a sequence of 0-32 octets used to identify a wireless local-area network (WLAN). Communication component 114 is additionally operable to communicate with communication component 120 of wireless communication device 106 over the generated temporary network. Communication component 114 is further operable to request and receive permanent network access credentials associated with permanent network 126 from onboarding component 116, via a line 134.

Onboarding component 116 is operable to receive a request for permanent network access credentials associated with permanent network 126 from communication component 114, via line 134. Onboarding component 116 is additionally operable to retrieve permanent network access credentials associated with permanent network 126 that are stored by memory 118, via a line 136.

Memory 118 is operable to store permanent network access credentials associated with permanent network 126.

Communication component 120 is operable to communicate with communication component 114 of network gateway 114 over a permanent network. Communication component 120 is additionally operable to scan for a temporary network that has an SSID that is associated with the temporary network access credentials of credential feature 124. Communication component 120 is further operable to communicate with communication component 114 over the temporary network associated with credential feature 124. Communication component 120 is yet further operable to provide permanent network access credentials associated with permanent network 126 to memory 122, via line 138.

Memory 122 is operable to store temporary network access credentials associated with credential feature 124. Memory 122 is additionally operable to store permanent network access credentials associated with permanent network 126 provided by communication component 120, via line 138. Memory 122 is additionally operable to provide access credentials associated with a permanent network and a temporary network to communication component 120, via line 138.

Credential feature 124 is operable to be a physical feature that is able to provide an SSID, password, and security type as feature data that is associated with a temporary network. Non-limiting examples of a credential feature 124 include an image, a QR code, a bar code or a display that is able to display the feature data. In some example embodiments, wherein when the feature data may be presented on a display, for example with a set top box or television, the feature data may be randomly generated.

An example method 200 for setting up a client device in accordance with aspects of the present invention will now be described with additional reference to FIGS. 2-7.

As shown in FIG. 2, method 200 starts (S202) and temporary network access credentials of the client device are obtained (S204). For example, as shown in FIG. 1, suppose a user purchased wireless communication device 106, which needs to access a network in order to operate properly. In this non-limiting example embodiment, wireless communication device 106 is a thermostat. In other embodiments, wireless communication device 106 may be a television, security system, router, smart-appliance, etc.

In order to connect wireless communication device 106 to a network, the user first obtains temporary network access credentials 128 that are associated with a temporary network that is assigned to wireless communication device 106. In this example embodiment, the temporary network is a unique network that is assigned to wireless communication device 106 during its fabrication. Additionally, temporary network access credentials 128 that are associated with the temporary network are stored as credential feature 124. In this example embodiment, temporary network access credentials 128 are an SSID, password, and security type and credential feature 124 is a QR code.

To obtain temporary network access credentials 128, the user may use input component 108 of communication device 102. In this non-limiting example embodiment, suppose that communication device 102 is a smart phone and that input component 108 is a camera that is able to scan a QR code. In other embodiments, communication device 102 may be a tablet, laptop, or smart-device. It is assumed that since the user already owns and is using communication device 102, that it has already been setup up to access a permanent network, which in this example embodiment is permanent network 126. Having been given access to permanent network 126, communication device 102 is a trusted device that is able to freely communicate with network gateway 104.

At this time, the user scans the QR code using their phone in order to obtain the access credentials associated with the network assigned to the thermostat. Afterwards, the user's phone instructs the network gateway to create a temporary network using the access credentials in order to allow communication between the network gateway and thermostat.

Returning to FIG. 2, after temporary network access credentials of the client device are obtained (S204), a temporary network is generated (S206). For example, as shown in FIG. 3, temporary network 304 is generated for communication between network gateway 104 and wireless communication device 106.

FIG. 3 illustrates network gateway 104 of FIG. 1 creating a temporary network in accordance of aspects of the present invention.

After obtaining temporary network access credentials 128, they are provided to instruction generating component 110 by input component 108, via line 130. After receiving temporary network access credentials 128, instruction generating component 110 will generate auto-onboarding instructions 302. The auto-onboarding instructions generated by the instruction generating component will instruct the network gateway to create a temporary network based on the temporary network access credentials that were stored as the QR code that was scanned in FIG. 1. The auto-onboarding instructions will also contain temporary network access credentials 128 that can be stored and used to establish a connection between the network gateway and thermostat.

Once auto-onboarding instructions 302 are generated, they are provided to communication component 112 by instruction generating component 110, via line 132. At this time, since communication device 102 is a trusted device, communication component 112 is able to provide auto-onboarding instructions 302 to communication component 114 of network gateway 104, via permanent network 126.

After being received, communication component 114 uses temporary network access credentials 128 that were received as auto-onboarding instructions 302 to generate temporary network 304.

The creation of the temporary network will allow communication between the network gateway and thermostat in order to continue the setup process. Since the thermostat was assigned an SSID, password, and security type during its fabrication it may only join a network with that given SSID, password, and security type and not the pre-existing permanent network used by the network gateway. Establishing a connection between the network gateway and thermostat using a temporary network will now be discussed with reference to FIG. 4.

Returning to FIG. 2, after the temporary network is generated (S206), a connection is established (S208). For example, as shown in FIG. 4, a connection over temporary network 304 is established by network gateway 104 and wireless communication device 106.

Suppose that once temporary network 304 is created, that the user turns on wireless communication device 106, so that it may begin operating. Once operating, communication component 120 begins scanning all available networks in order to find a network associated with access credentials 128. At some point, communication component 120 finds a network with an SSID that matches the SSID associated with access credentials 128, which in this example embodiment is temporary network 304.

Once communication component 120 finds temporary network 304, it retrieves the security type and password that are associated with temporary network 304 from memory 122, via line 138. After retrieval, communication component 120 generates security signal 402 based on the associated security type and password. Once generated, communication component 120 transmits security signal 402 to communication component 114, via temporary network 304.

Next, communication component 114 receives security signal 402 and establishes secure communications with wireless communication device 106. At this time a connection has been established and wireless communication device 106 and network gateway 104 are able to freely communicate over the secure temporary network 304.

Once connected over temporary network 304, permanent network access credentials associated with permanent network 126 need to be obtained by wireless communication device 106 so that it may communicate with network gateway 104 over permanent network 126.

Returning to FIG. 2, after a connection is established (S208), the permanent network access credentials are transmitted (S210). For example, as shown in FIG. 5, the permanent network access credentials for permanent network 126 are transmitted by network gateway 104 to wireless communication device 106.

As further illustrated in FIG. 5, once a connection between network gateway 104 and wireless communication device 106 is established over temporary network 304, wireless communication device 106 will request permanent network access credentials for permanent network 126, which in this example embodiment, are access credentials 502.

To begin, communication component 120 will generate and transmit request signal 504 to communication component 114, via temporary network 304. Communication component 114 receives request signal 504, which it then provides to onboarding component 116, via line 134. Upon receiving request signal 504, onboarding component 116 retrieves permanent network access credentials 502 from memory 118, via line 136. Permanent network access credentials 502 contain the SSID, password, and security type associated with permanent network 126.

After retrieval, onboarding component 116 provides permanent network access credentials 502 to communication component 114, via line 134. At this time, communication component 114 transmits access credentials to communication component 120 over temporary network 304. Communication component 120 then provides permanent network access credentials 502 to memory 122, via line 138. Memory 122 then stores permanent network access credentials 502 so that they may be used to join permanent network 126.

Having received permanent network access credentials 502, wireless communication device 106 will attempt to join permanent network 126.

Returning to FIG. 2, after the permanent network access credentials are obtained (S210), the client device joins the permanent network (S212). For example as shown in FIG. 6, wireless communication device 106 establishes a connection with network gateway 104 over permanent network 126.

The process of wireless communication device 106 joining a permanent network is similar to the process of communication device 106 joining a temporary network as described above in FIG. 4. Once permanent network access credentials 502 have been obtained, communication component 120 begins scanning all available networks in order to find a network with an SSID that matches the SSID of access credentials 502. At some point, communication component 120 finds a network with an SSID that matches the SSID associated with permanent network access credentials 502, which in this example embodiment is permanent network 126.

Once communication component 120 finds permanent network 126, it retrieves the security type and password associated with permanent network 126 from memory 122 as permanent network access credentials 502. Communication component 120 then uses permanent network access credentials 502 to generate security signal 602. Once generated, communication component 120 transmits security signal 602 to communication component 114 of network gateway 106, via permanent network 126.

Next, communication component 114 receives security signal 602 and verifies the credentials in order to register wireless communication device 106 as a trusted device that is able to freely communicate with network gateway 104 over permanent network 126. Once the connection between the network gateway and wireless communication device is established over the permanent network, the temporary network has served its purpose and is no longer needed for the operation of system 100.

Returning to FIG. 2, after the client joins a permanent network (S212), the temporary network is deleted (S214). For example as shown in FIG. 7, temporary network 304 is terminated and all communication between network gateway 104 and wireless communication device 106 occurs over permanent network 126.

Once wireless communication device 106 has joined permanent network 126 by onboarding permanent network 126 of network gateway 104, the temporary network created is no longer needed. As such, once the onboarding is completed, communication component 114 will stop operating using the temporary network access credentials associated with the temporary network and only operate using the permanent network access credentials associated with the permanent network. Once communication component 114 stops operating with the use of the temporary network access credentials, the temporary network no longer exists and is not available for access to any communication device.

Returning to FIG. 2, after the temporary network is deleted (S214), method 200 stops (S216). Once the temporary network is deleted, the setup process is completed and the thermostat is able to operate while having access to the permanent network.

In summary, a problem with the current system and method of installation and setup process of wireless communication devices is that access credentials are input by a user. The process of inputting access credentials into a device may be problematic or challenging for some users, leading to them discontinuing use of the device.

The present invention simplifies the installation and setup process of wireless communication devices by requiring only a single step from a user. By using a smart phone, tablet, or other device already connected to their permanent network, a user is able to simply scan the wireless communication device and the setup process is completed automatically over a temporary network.

The device used to scan the wireless communication device transmits access credentials for a temporary network to a network gateway. The network gateway then takes over by creating a temporary network, over which access credentials for the permanent network are obtained by the smart device. Afterwards, the wireless communication device joins the permanent network using the newly obtained access credentials and the temporary network is removed.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A wireless communication device located within range of a network gateway, comprising:
   a communication component to communicate with a network gateway;
   a memory component for storing network access credentials; and
   a credential feature that includes temporary network access credentials, the temporary network access credentials displayed on the wireless communication device, and while located within range of the network gateway, the temporary network access credentials being read by a communication device connected to a network device using a permanent network connection and sent by the communication device to the network gateway using the permanent network connection, the communication component of the wireless communication device establishing a temporary network connection with the network gateway based on the temporary network access credentials sent to the network gateway by the communication device, and wherein said communication component of the wireless communication device further receives permanent network access credentials from the network gateway over the temporary network connection, joins a permanent network connection with the network gateway using the permanent network access credentials, and then removes the temporary network connection.

2. The wireless communication device of claim 1, wherein said wireless communication device comprises one of a group consisting of a thermostat, a television, a set top box and an appliance.

3. The wireless communication device of claim 2, wherein said credential feature comprises one of the group consisting of a serial number, a Quick Response (QR) code, a bar code and combinations thereof.

4. The wireless communication device of claim 1, wherein said credential feature comprises a serial number.

5. The wireless communication device of claim 1, wherein said credential feature comprises a Quick Response (QR) code.

6. The wireless communication device of claim 1, wherein said credential feature comprises a bar code.

7. The wireless communication device of claim 1, wherein said credential feature comprises a combination of a serial number and a quick response (QR) code.

8. A method of establishing a permanent network connection between a wireless communication device and a network gateway, said method comprising:
   providing the wireless communication device with a communication component operable to communicate with the network gateway, a memory component for storing network access credentials therein, and a credential feature associated with temporary network access credentials, the temporary credentials being displayed on the wireless communication device;
   reading, via the communication device while the wireless communication device is in range of the network device, the credential feature displayed on the wireless communication device to obtain from the credential feature the temporary network access credentials and sending the temporary credentials by the communication device to the network gateway;
   establishing, via the communication component of the wireless communication device, the temporary network connection with the network gateway based on the temporary network access credentials sent to the network gateway by the communication device;
   providing, via the network gateway and through the temporary network connection, permanent network access credentials to the wireless communication device;
   establishing, by the wireless communication device, a permanent network connection with the network gateway using the permanent network access credentials received over the temporary network connection; and
   removing, via the network gateway, the temporary network connection.

9. The method of claim 8, wherein said communication device comprises providing one of a group consisting of a thermostat, a television, a set top box and an appliance.

10. The method of claim 9, wherein said credential feature comprises, one of the group consisting of a serial number, a Quick Response (QR) code, a bar code and combinations thereof.

11. The method of claim 10, wherein said credential feature comprises, a serial number.

12. The method of claim 10, wherein credential feature comprises, a Quick Response (QR) code.

13. The method of claim 10, wherein said credential feature comprises, a bar code.

14. The method of claim 8, wherein said credential feature comprises a combination of a serial number and, a Quick Response (QR) code.

\* \* \* \* \*